US012291892B2

(12) United States Patent
Raz

(10) Patent No.: US 12,291,892 B2
(45) Date of Patent: May 6, 2025

(54) PANEL CLOSURE APPARATUS

(71) Applicant: Dan Raz Ltd., Tirat Carmel (IL)

(72) Inventor: Amir Raz, Haifa (IL)

(73) Assignee: Dan Raz Ltd., Tirat Carmel (IL)

( * ) Notice: Subject to any disclaimer, the term of this patent is extended or adjusted under 35 U.S.C. 154(b) by 811 days.

(21) Appl. No.: 17/423,154

(22) PCT Filed: Jan. 15, 2020

(86) PCT No.: PCT/IB2020/050315
§ 371 (c)(1),
(2) Date: Jul. 15, 2021

(87) PCT Pub. No.: WO2020/148682
PCT Pub. Date: Jul. 23, 2020

(65) Prior Publication Data

US 2022/0127879 A1 Apr. 28, 2022

Related U.S. Application Data

(60) Provisional application No. 62/792,424, filed on Jan. 15, 2019.

(51) Int. Cl.
*E05B 17/20* (2006.01)
*E05B 63/00* (2006.01)
(Continued)

(52) U.S. Cl.
CPC .......... *E05B 17/20* (2013.01); *E05B 63/0052* (2013.01); *E05C 3/124* (2013.01); *E05C 19/002* (2013.01)

(58) Field of Classification Search
CPC ...... E05C 19/002; E05C 19/026; E05C 3/124; E05B 17/0025; E05B 63/0052; E05B 2047/0094
See application file for complete search history.

(56) References Cited

U.S. PATENT DOCUMENTS 7,578,531 B1 8/2009 Leontaridis
8,707,625 B2 4/2014 Raz
(Continued)

FOREIGN PATENT DOCUMENTS

DE 10329560 B4 2/2004
DE 10322798 A1 12/2004
(Continued)

*Primary Examiner* — Gilbert Y Lee
*Assistant Examiner* — Yahya Sidky
(74) *Attorney, Agent, or Firm* — Rivka Friedman

(57) ABSTRACT

A panel closure apparatus has a panel (14) for closing against a strike jamb (12). A locking element (100) is displaceable between a released position and a locked position in which contact surfaces (102, 104) of the locking element and the panel prevent opening of the panel, and are configured so that force applied to open the panel does not generate a force to disengage the locking element. Locking element (100) has an input surface (108) deployed so as to be displaced by an actuating surface (110) of panel (14) during a closing motion of the panel from the open position to the closed position. Input surface (108) moves as a unit with locking element (100) so that displacement of the input surface by the closing motion of the panel displaces the locking element towards the locked position.

18 Claims, 16 Drawing Sheets

(51) Int. Cl.
*E05C 3/12* (2006.01)
*E05C 19/00* (2006.01)

(56) References Cited

U.S. PATENT DOCUMENTS

| | | | |
|---|---|---|---|
| 9,598,894 | B2 | 3/2017 | Raz |
| 9,970,214 | B2 | 5/2018 | Raz |
| 9,970,274 | B2 | 5/2018 | Raz |
| 9,988,830 | B2 | 6/2018 | Raz |
| 10,138,654 | B2 | 11/2018 | Raz |
| 10,480,213 | B2 | 11/2019 | Raz |
| 10,774,578 | B2 | 9/2020 | Raz |
| 10,865,588 | B2 | 12/2020 | Raz |
| 11,371,263 | B2 | 6/2022 | Raz |
| 2013/0000205 | A1 | 1/2013 | Raz |
| 2014/0190098 | A1 | 7/2014 | Raz |
| 2017/0152676 | A1* | 6/2017 | Raz ......................... E05B 65/06 |
| 2017/0025412 | A1 | 9/2017 | Raz |
| 2017/0254119 | A1 | 9/2017 | Raz |
| 2017/0254125 | A1 | 9/2017 | Raz |
| 2018/0209175 | A1 | 7/2018 | Raz |
| 2018/0252025 | A1 | 9/2018 | Raz |
| 2019/0071895 | A1 | 3/2019 | Raz |

FOREIGN PATENT DOCUMENTS

| | | | |
|---|---|---|---|
| EP | 1333230 | A2 | 8/2003 |
| EP | 1422368 | A1 | 5/2004 |
| GB | 2250772 | A | 6/1992 |

* cited by examiner

PANEL CLOSURE APPARATUS

FIELD AND BACKGROUND OF THE INVENTION

The present invention relates to a panel closure apparatus and, in particular, it concerns a panel lock apparatus for locking a panel relative to a strike jamb.

The applicant's prior U.S. Pat. No. 9,970,214 (hereafter "the '214 patent") discloses a lock mechanism in which a closing motion of a panel displaces a locking element towards its locked position. Motion of the locking element is thus synchronized with the closing motion of the panel, and begins before the panel reaches its fully closed position.

SUMMARY OF THE INVENTION

The present invention is a panel closure apparatus.

According to the teachings of an embodiment of the present invention there is provided, an apparatus comprising: (a) an opening bounded in part by a strike jamb; (b) a panel mounted relative to the opening so as to be displaceable between an open position in which the panel is separated from the strike jamb to leave at least part of the opening open and a closed position in which the panel closes against the strike jamb; and (c) a lock mechanism associated with the strike jamb, the lock mechanism comprising a locking element displaceable relative to the strike jamb along a path of motion from a released position in which the panel can be separated from the strike jamb to a locked position in which the locking element obstructs displacement of the panel from the strike jamb, contact surfaces of the locking element and the panel being such that a force applied to the panel directed to open the panel does not generate a force acting to displace the locking element back along the path of motion, wherein the locking element provides an input surface deployed so as to be displaced by an actuating surface of the panel during a closing motion of the panel from the open position to the closed position, the input surface moving as a unit with the locking element so that displacement of the input surface by the closing motion of the panel displaces the locking element towards the locked position.

There is also provided according to the teachings of an embodiment of the present invention, an apparatus comprising: (a) an opening bounded in part by a strike jamb; (b) a panel mounted relative to the opening so as to be displaceable between an open position in which the panel is separated from the strike jamb to leave at least part of the opening open and a closed position in which the panel closes against the strike jamb; and (c) a lock mechanism associated with the panel, the lock mechanism comprising a locking element displaceable relative to the panel along a path of motion from a released position in which the panel can be separated from the strike jamb to a locked position in which the locking element obstructs displacement of the panel from the strike jamb, contact surfaces of the locking element and the strike jamb being such that a force applied to the panel directed to open the panel does not generate a force acting to displace the locking element back along the path of motion, wherein the locking element provides an input surface deployed so as to be displaced by an actuating surface of the strike jamb during a closing motion of the panel from the open position to the closed position, the input surface moving as a unit with the locking element so that displacement of the input surface by the closing motion of the panel displaces the locking element towards the locked position.

According to a further feature of an embodiment of the present invention, the input surface and the actuating surface are deployed such that displacement of the locking element towards the locked position begins prior to the panel reaching the closed position.

According to a further feature of an embodiment of the present invention, when displaced towards the locked position, the locking element passes a critical point such that an opening force applied to the panel results in geometrical or frictional locking of the locking element with the panel and the strike jamb sufficient to oppose displacement of the locking element towards the unlocked position.

According to a further feature of an embodiment of the present invention, the lock mechanism is configured such that completion of the closing motion of the panel can only occur when the locking element assumes the locked position.

According to a further feature of an embodiment of the present invention, the locking element is pivotally mounted about an axis of rotation.

According to a further feature of an embodiment of the present invention, a distance from the axis of rotation to the contact surface of the locking element is greater than a distance from the axis of rotation to the input surface.

According to a further feature of an embodiment of the present invention, a part of the panel overlaps a part of the strike jamb in the closed position, and wherein the input surface is located in a region of the overlap.

According to a further feature of an embodiment of the present invention, the panel is hingedly mounted relative to the opening.

According to a further feature of an embodiment of the present invention, the panel is slidingly mounted relative to the opening.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a panel closure apparatus.

The principles and operation of an apparatus according to the present invention may be better understood with reference to the drawings and the accompanying description.

Figure 1:
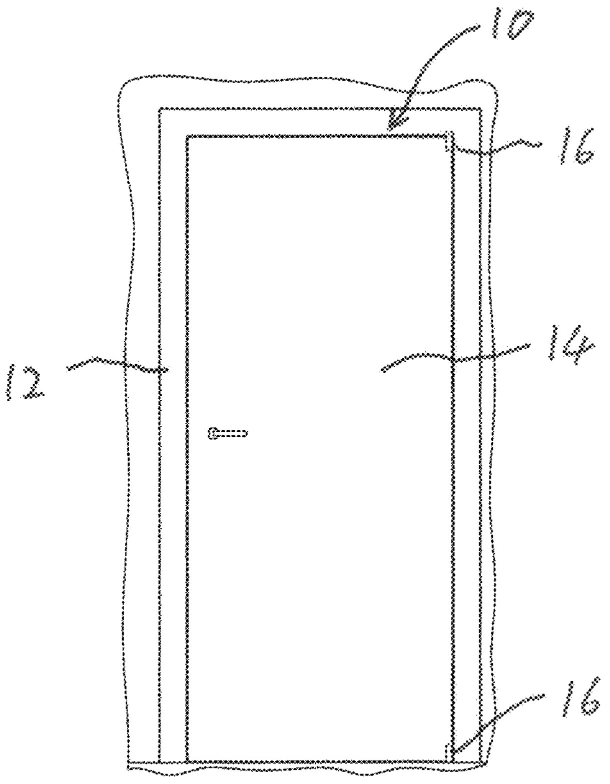
FIG. 1 is a schematic front view of an apparatus including a panel lock apparatus, constructed and operative according to an embodiment of the present invention, for locking and releasing a panel relative to an opening.
Figure 2:
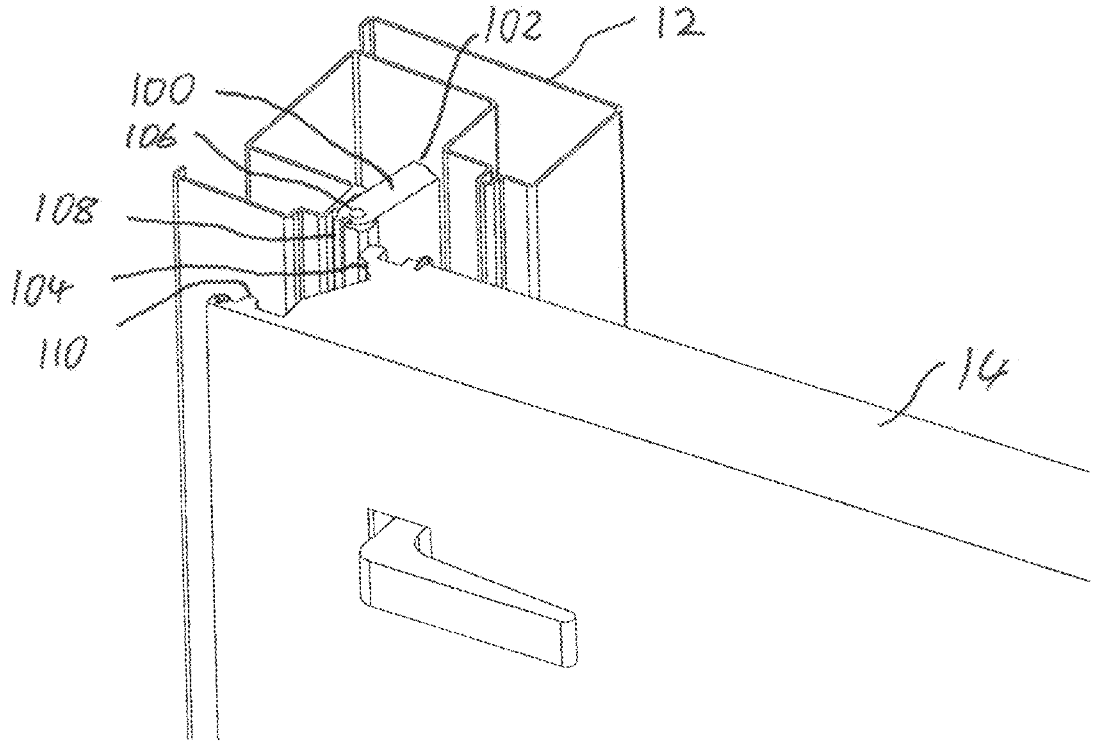
FIG. 2 is a partial, cut-away isometric view of an implementation of the panel lock apparatus of FIG. 1, shown with the panel open away from the strike jamb.

Referring now to the drawings, FIG. 1 shows an overview of a panel closure apparatus, which may be considered generic to all of the non-limiting embodiments presented herein, in which an opening 10, bounded in part by a strike jamb 12, is selectively closable by motion of a panel 14. Panel 14 is mounted relative to opening 10 so as to be displaceable between an open position, in which panel 14 is separated from strike jamb 12 to leave at least part of the opening open, and a closed position, in which panel 14 closes against strike jamb 12 (as shown in FIG. 1). In the non-limiting examples illustrated herein, panel 14 is hingedly mounted relative to opening 10, such as by hinges 16. The present invention is also applicable, with adaptations that will be self-explanatory to one having ordinary skill in the art in view of the present description, in a context in which panel 14 is slidingly mounted relative to opening 10.

The present invention also includes a lock mechanism which may be either associated with the strike jamb, as exemplified in FIGS. 2-7E and 13A-14D, or with the panel, as exemplified in FIGS. 8-11C.

Referring first to implementations with a lock mechanism associated with strike jamb 12, FIGS. 2-7E illustrate a lock mechanism with a locking element 100 displaceable relative to strike jamb 12 along a path of motion from a released position (FIG. 3A) in which panel 14 can be separated from strike jamb 12 to a locked position (FIG. 3E) in which locking element 100 obstructs displacement of panel 14 away from strike jamb 12. Locking element 100 and panel 14 have complementary contact surfaces, designated 102 and 104, respectively. Contact surfaces 102 and 104 are preferably configured, through their shape, angle and/or position relative to the path of motion, such that a force applied to panel 14 directed to open the panel does not generate a force acting to displace the locking element back along the path of motion. In other words, in the locked position of FIG. 3E, force applied to panel 14 to try to open the panel is effectively opposed by forces transferred via locking element 100 between the panel and the strike jamb, with geometrical and/or frictional locking occurring between the locking element and the complementary surfaces of the panel and the strike jamb. As a result, the locking is effective without requiring any additional mechanism to secure the locking element in place. (Additional locking may optionally be provided to generate a “deadlock” effect, preventing accidental or unauthorized displacement of the locking element away from the locking position, as exemplified below with reference to FIGS. 4A-7E. However, the locking element is effective to prevent opening of the panel even without such additional locking.)

The complementary surfaces of the strike jamb 12 to which locking element 100 transfers forces may be provided by a structure which defines the aforementioned path of motion. In the non-limiting but preferred options illustrated here, the path of motion is a pivotal motion about an axis 106, which may be defined by an axle extending through the locking element or by pivotal connection of the locking element to supports (not shown) integrated with strike jamb 12. Additionally, or alternatively, secondary support surfaces 107 (FIG. 3F) may be positioned such that, in the case of a heavy load applied to the panel, locking element 100 comes into contact with the secondary support surfaces which provide supplementary support.

It is a particular feature of certain particularly preferred implementations of the present invention that locking element 100 provides an input surface 108 deployed so as to be displaced by an actuating surface 110 of panel 14 during a closing motion of the panel from the open position to the closed position. This is illustrated by the series of positions shown in FIGS. 3A-3E. As panel 14 moves towards strike jamb 12 (shown in process in FIG. 3A), the panel reaches a point at which actuating surface 110 contacts input surface 108. Further motion of the panel then applies force to input surface 108 so as to advance locking element 100 along its path of motion, in this case, rotation about axis 106, towards its locked position (sequence of FIGS. 3C-3E).

Input surface 108 here moves as a unit with locking element 100 so that displacement of the input surface by the closing motion of the panel displaces the locking element towards the locked position. The input surface may be integrally formed as part of locking element 100, or may be provided by a separate component which is attached to the locking element. In either case, at least during normal operation, the input surface is preferably rigidly associated with the locking element so that they move as a unit, undergoing the same solid body motion.

Actuating surface 110 is in this case a surface of the panel, which may be one of the standard surfaces of the main portion of the panel, or may be a dedicated surface that is provided by a projecting feature, or any other suitably configured feature, which may be integrally formed with the rest of the panel or may be attached to the panel, typically rigidly.

It will be noted that particularly preferred implementations of the present invention thus achieve synchronization of motion of the locking element with closure of the panel. In other words, input surface 108 and actuating surface 110 are deployed such that displacement of locking element 100 towards the locked position begins prior to the panel reaching its closed position. Notably, this is spatial synchronization, such that displacement tends to adjust itself according to the speed of motion of the panel.

Figure 3A:
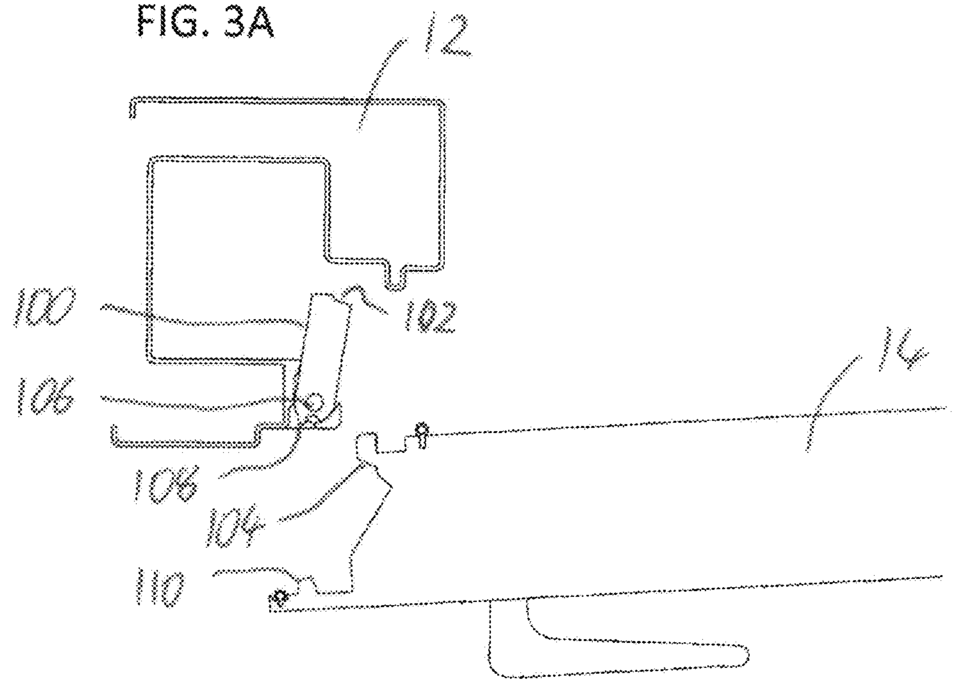
FIGS. 3A-3E are partial, horizontal cross-sectional views showing a sequence of positions during closing of the panel of FIG. 2.
Figure 3F:
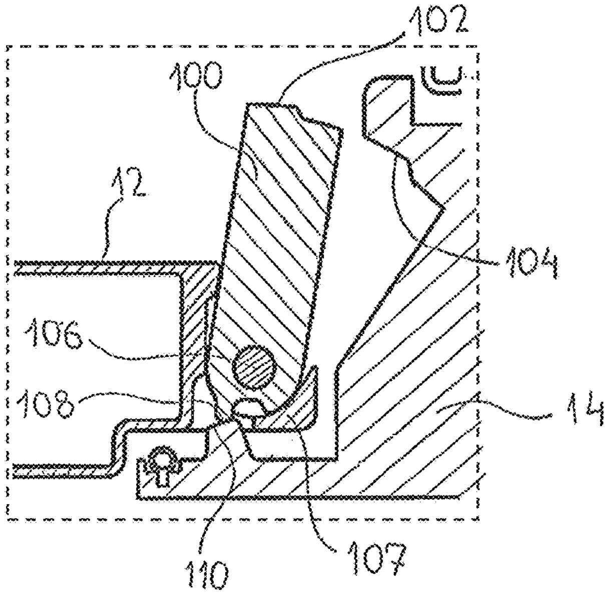
FIG. 3F is an enlarged view of the region of FIG. 3B designated by dashed box "B"
Figure 3B:
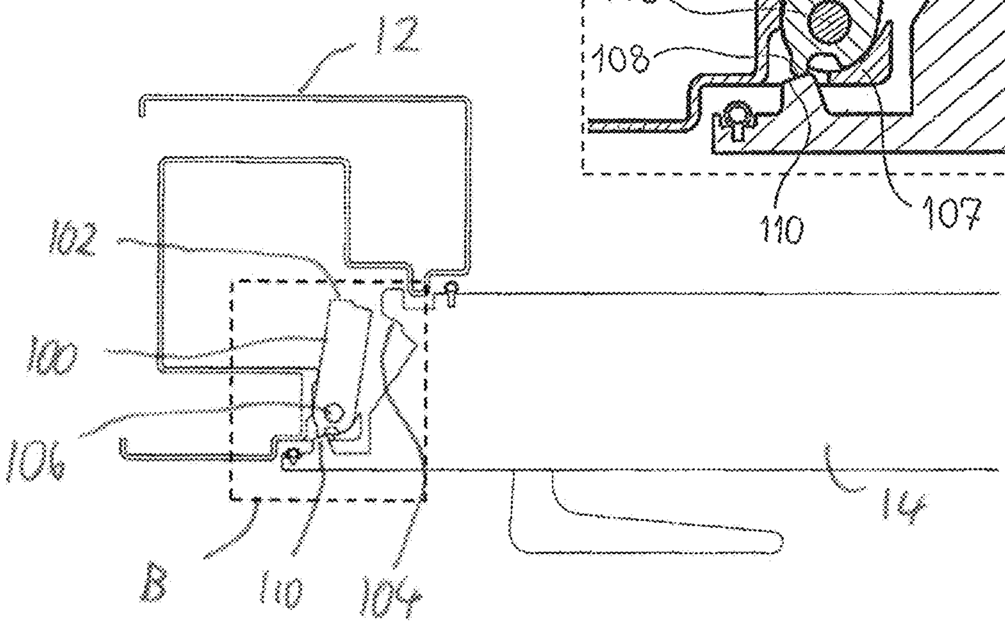
Figure 3C:
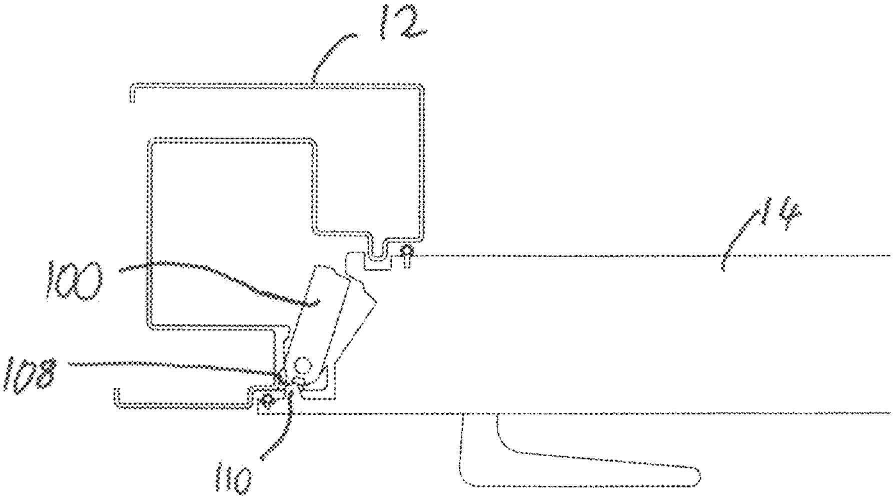
Figure 3D:
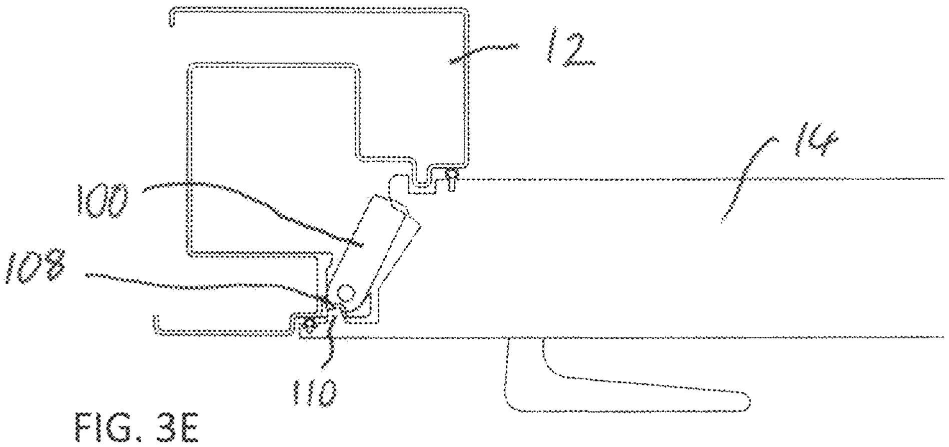
Figure 3E:
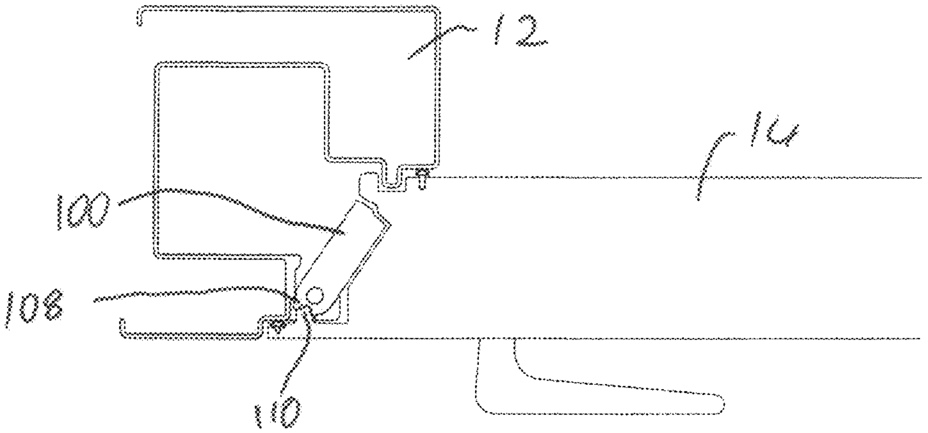
Figure 4A:
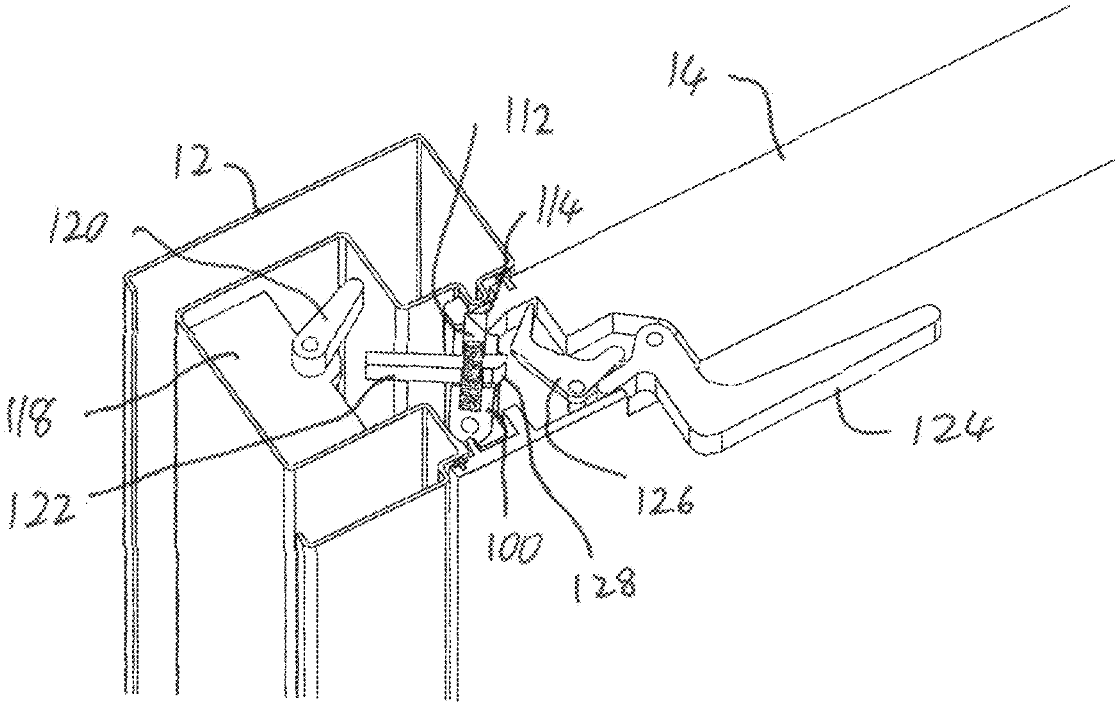
FIG. 4A is a partial, cut-away isometric view of a variant of the implementation of FIG. 2, cut away on a horizontal plane passing through a handle, shown with the panel closed against the strike jamb.
Figure 4B:
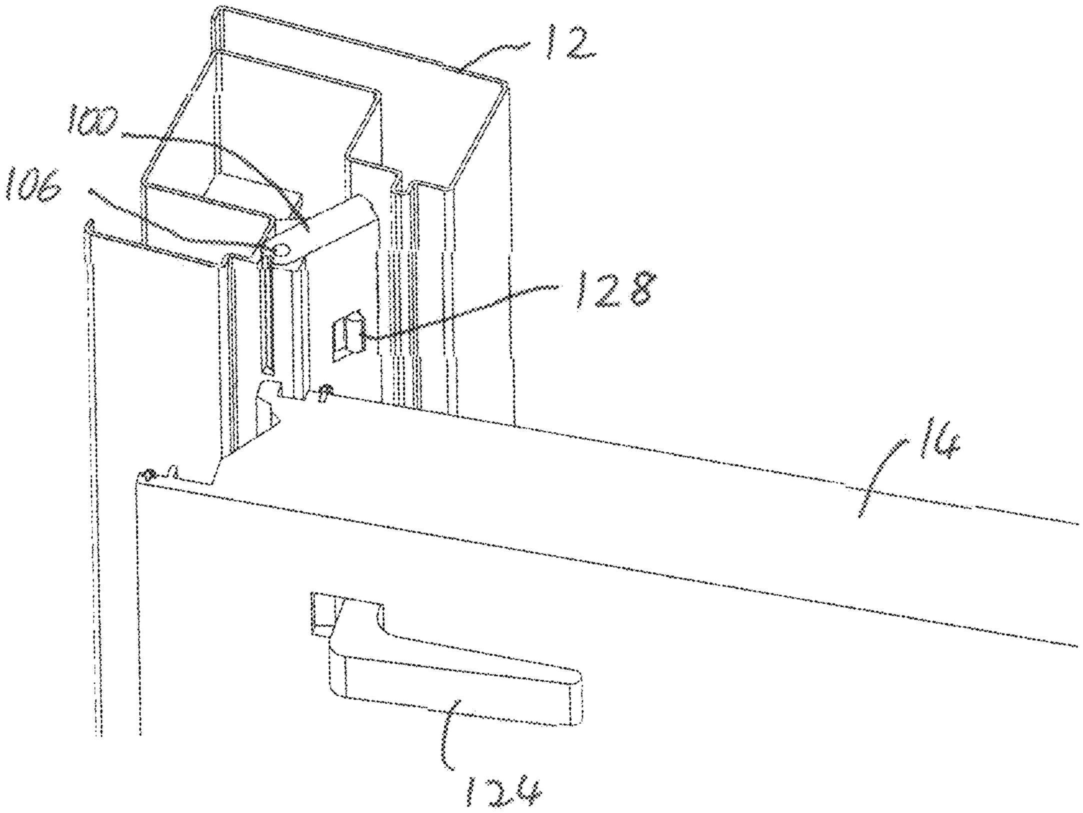
FIG. 4B is a view similar to FIG. 4A cut away on a horizontal plane above the handle, shown with the panel open away from the strike jamb.
Figure 5A:
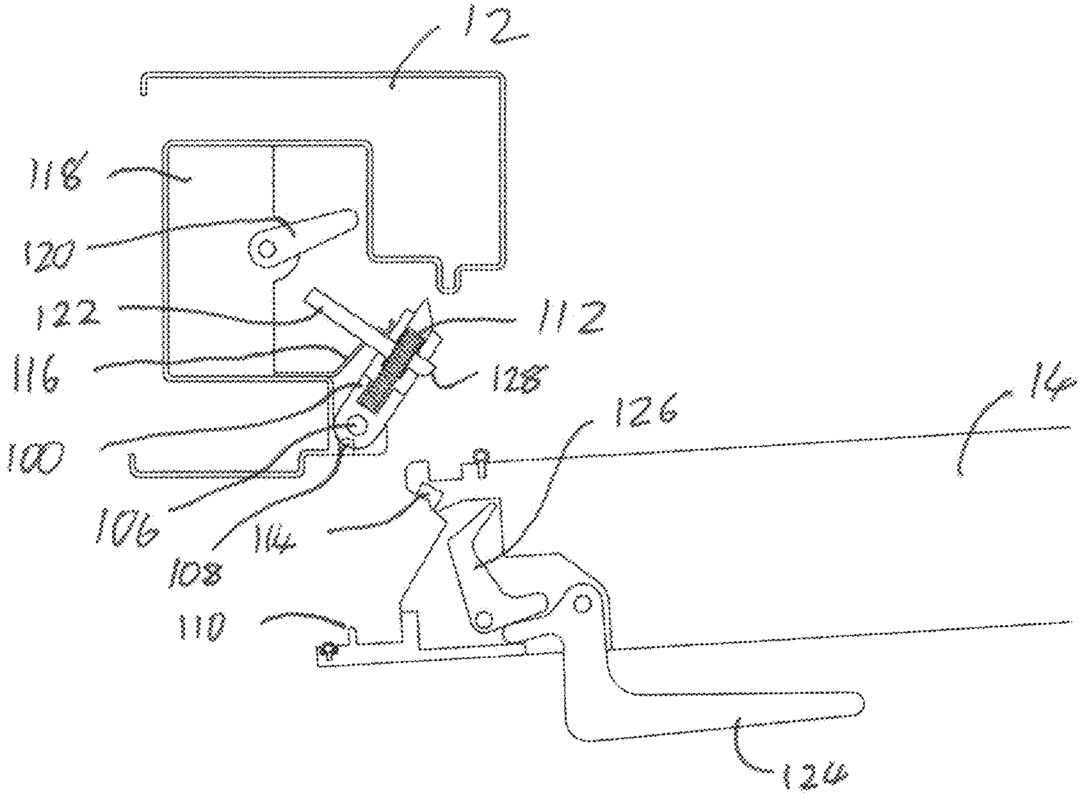
FIGS. 5A-5E are partial, horizontal cross-sectional views showing a sequence of positions during closing of the panel of FIG. 4A.
Figure 5B:
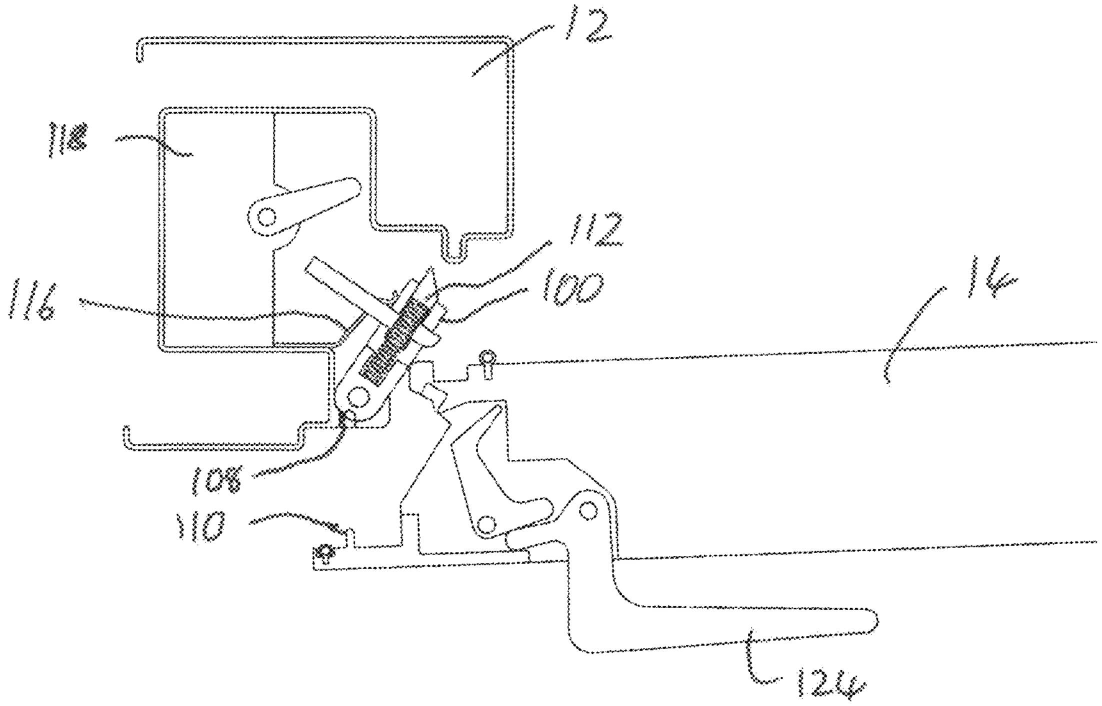
Figure 5C:
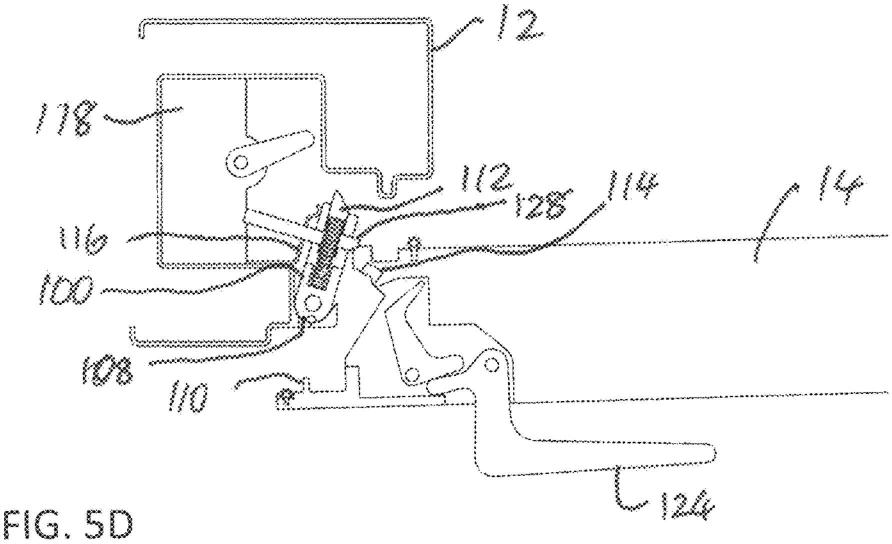
Figure 5D:
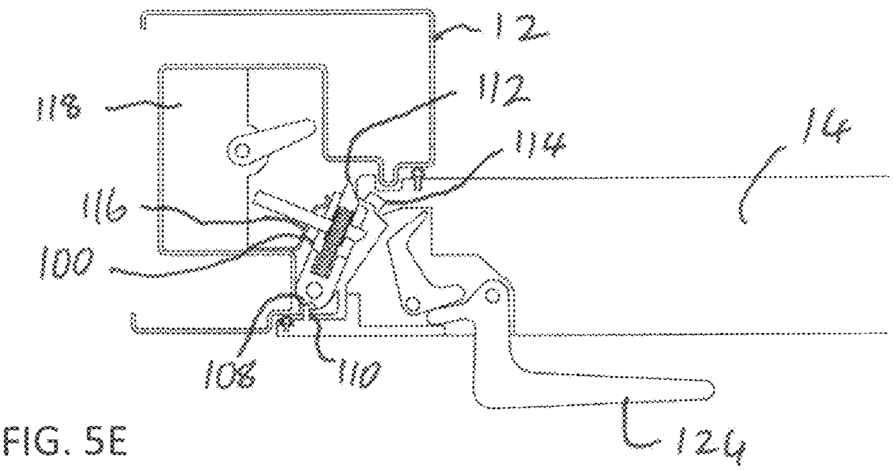
Figure 5E:
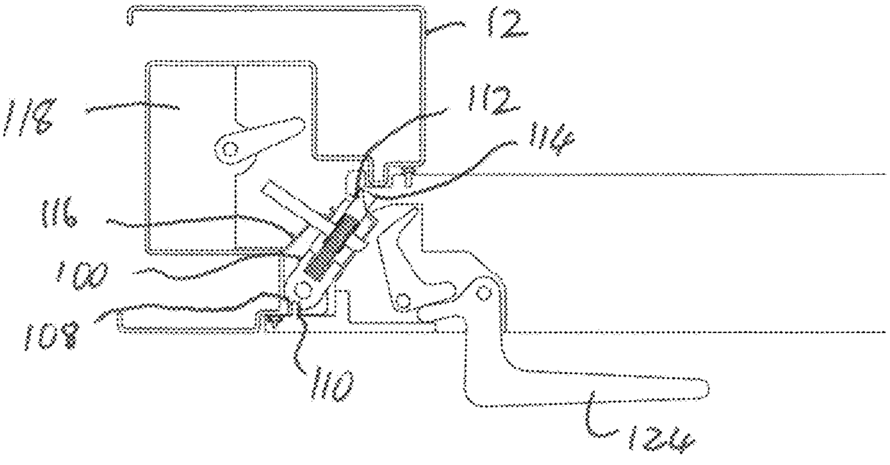

Most preferably, the configuration of contact surfaces 102 and 104 is such that, when displaced towards the locked position, locking element 100 passes a critical point, before reaching its fully locked position, such that an opening force applied to the panel results in geometrical or frictional locking of the locking element with the panel and the strike jamb sufficient to oppose displacement of the locking element towards the unlocked position. In the structure illustrated in FIGS. 3C and 3D, this critical point is advantageously at, or just beyond, the point at which overlap starts to occur between contact surfaces 102 and 104, as illustrated in FIG. 3C. Effective locking in these intermediate positions can be achieved, for example, by forming the contact surface(s) 102 as one or more arcuate surface centered on the axis of rotation 106, or slightly to the right thereof as shown. Contact surfaces 104 are preferably implemented with complementary forms. Optionally, contact surfaces 102 and 104 may have a stepped form, which facilitates overlap of the surfaces at an earlier stage of the closing motion of the panel, and with relatively small gaps in the fully locked position.

As a corollary to the spatial synchronization referred to above, and as an important feature in its own right, it will be noted that the interaction of actuating surface 110 and input surface 108 is such that completion of the closing motion of panel 14 to a fully closed position can only occur when locking element 100 assumes its locked position. This provides convenient visual confirmation that, whenever the panel is seen to be closed, the user knows that it is in fact locked.

In the particularly preferred but non-limiting implementation illustrated here, locking element 100 is pivotally mounted about axis of rotation 106. In certain cases, it is advantageous to provide motion amplification, in the sense that contact surface 102 of the locking element undergoes a larger amplitude of motion than input surface 108. In the context of a pivotally-mounted locking element, this may be achieved by ensuring that a distance from axis of rotation 106 to contact surface 102 is greater than a distance from axis of rotation 106 to input surface 108.

In the particular example discussed thus far, it will be noted that a part of panel 14 overlaps a part of strike jamb 12 in the closed position, and that input surface 108 and corresponding actuating surface 110 are located in the region of the overlap.

Strike jamb 12 itself is shown here schematically as a hollow profile, which is typically part of a frame surrounding the opening. It should be appreciated that the strike jamb can be implemented in a wide range of configurations, including a hollow or filled profile, optionally formed from multiple components to add additional properties, such as to provide a thermal break across the structure. Optionally, the strike jamb may be integrated as part of a wall structure.

Turning now to FIGS. 4A-7E, there is shown a variant implementation of the apparatus described thus far, expanded to illustrate a number of additional features. In the preferred implementation illustrated here, these include: a "deadlock" mechanism which secures locking element 100 in its locked position to render the apparatus more resistant to unauthorized tampering; a panel-mounted handle for releasing the deadlock and unlocking the apparatus; and a strike-jamb mounted actuator for releasing the deadlock and unlocking the apparatus. This implementation is also distinguished from the earlier-illustrated implementation in that locking element 100 is here spring-biased towards its locked position. These features will be described below. In all other respects, the configurations of FIGS. 4A-7E are similar to that of FIGS. 2-3F, with the same reference numerals used for analogous features.

The deadlock mechanism here includes a spring-loaded catch 112 mounted in a channel within locking element 100 so as to engage a corresponding recess 114 in panel 14. Catch 112 has an inclined leading surface so as to ride over a surface of panel 14 until reaching and resiliently engaging recess 114. The sequence of motion during closing of panel 14 is illustrated in FIGS. 5A-5E. Specifically, in FIGS. 5A-5C, a leading surface of panel 14 bears against locking element 100, causing it to retract towards its unlocked position against the bias of a spring 116. When contact surface 102 of locking element 100 reaches the beginning of contact surface 104 of panel 14, both spring 116 and the interaction of actuating surface 110 with input surface 108 contribute to displacing locking element 100 along its path of motion towards its locked position. As the locking element engages, the inclined leading surface of catch 112 rides over the corresponding surface of panel 14 until it reaches recess 114 and engages the recess, thereby preventing forced retraction of locking element 100 until catch 112 is released.

Although both the spring 116 and the actuating surface/input surface engagement contribute to displacement of locking element 100 towards its locked position, it should be noted that the positive displacement generated by actuating surface 110 and input surface 108 provides additional functionality which is not offered by spring 116 alone. Since the configuration of actuating surface 110 and input surface 108 prevents full closure of panel 14 as long as locking element 100 is not engaged. Thus, unlike a spring-operated mechanism which may fail to engage, this configuration provides visual confirmation to the user that, so long as the panel has reached its fully closed position, the user can be certain that the panel is locked.

Figure 6A:
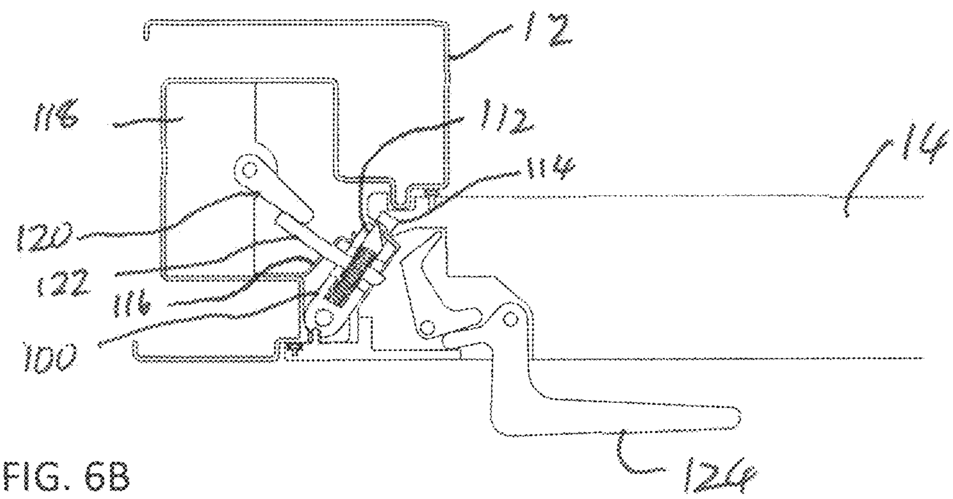
FIGS. 6A-6C are partial, horizontal cross-sectional views showing a sequence of positions during opening of the panel of FIG. 4A by an actuator in the strike jamb.
Figure 6B:
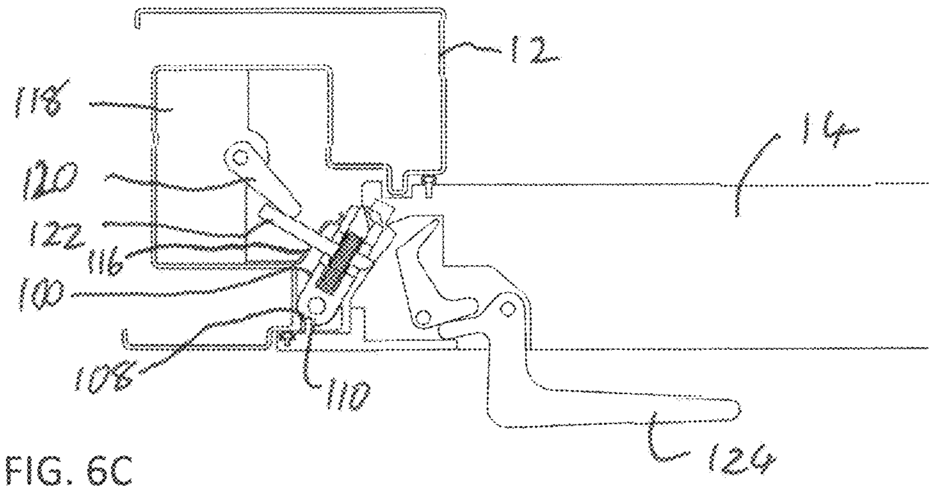
Figure 6C:
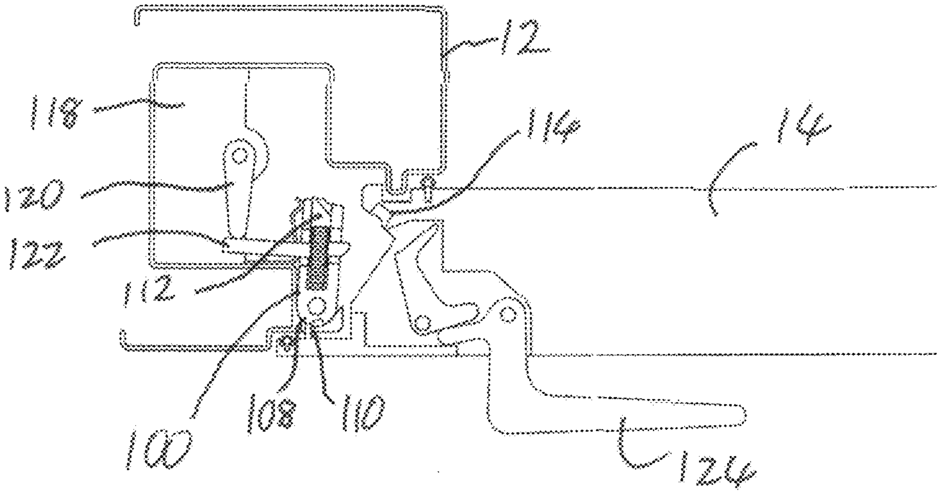

FIGS. 6A-6C illustrate operation of an actuator 118 mounted in strike jamb 12 to release catch 112 and retract locking element 100 to its unlocked position. In the non-limiting example illustrated here, a rotary actuator arm 120 of actuator 118 selectively engages a projecting rod 122 associated with catch 112. Force of actuator arm 120 on rod 122 causes sequentially retraction of catch 112 (FIG. 6B) and then deflection of locking element 100 towards its unlocked position (FIG. 6C). Actuator 118 may be any sort of actuator, including an electric, hydraulic or pneumatic powered actuator, operated locally or remotely via a suitable controller (not shown) responsive to an authorized wireless signal or an unlock signal from a smart home control system. Additionally, or alternatively, actuator 118 may be a manually operated mechanism operated, for example, by a key inserted into a cylinder (not shown).

Figure 7A:
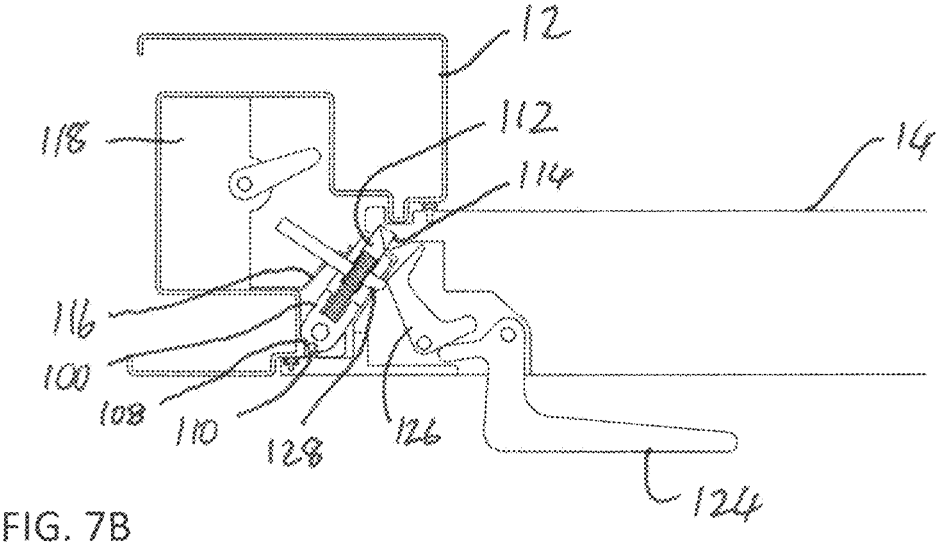
FIGS. 7A-7E are partial, horizontal cross-sectional views showing a sequence of positions during opening of the panel of FIG. 4A by operation of a handle on the panel.
Figure 7B:
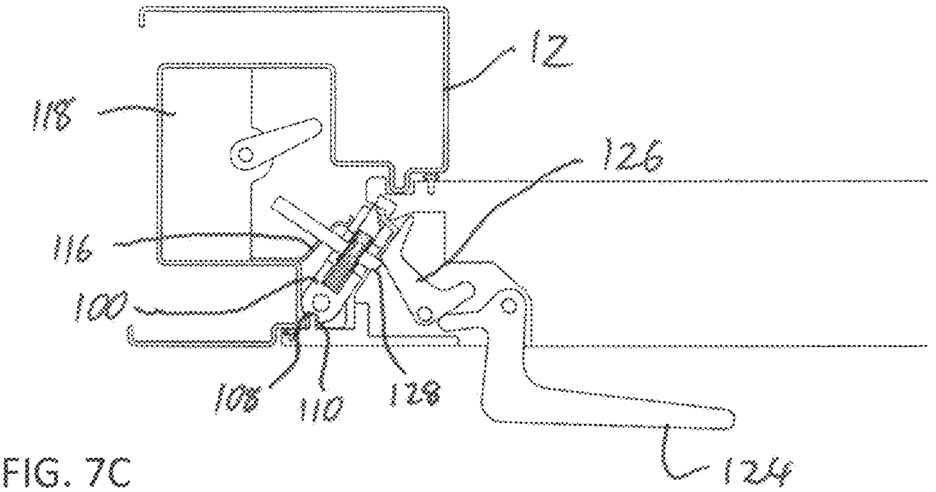
Figure 7C:
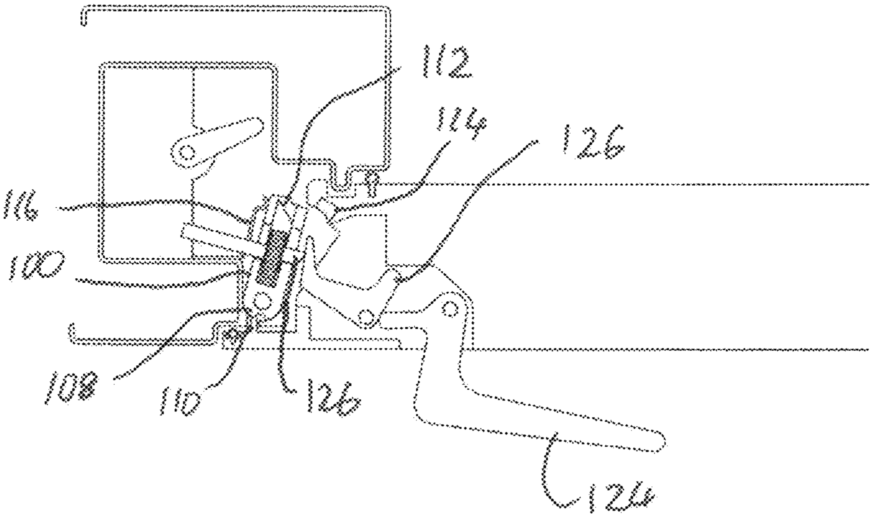

FIGS. 7A-7E illustrate operation of a manual handle 124 mounted on panel 14. In the implementation shown here, handle 124 is a pivotally-mounted lever which bears on a pivotally-mounted rocker element 126 which is shaped so as to catch a projecting tooth 128 (optionally an extension of rod 122) associated with catch 112, thereby retracting catch 112 (FIG. 7B) and then displacing locking element 100 towards its unlocked position (FIG. 7C).

Figure 7D:
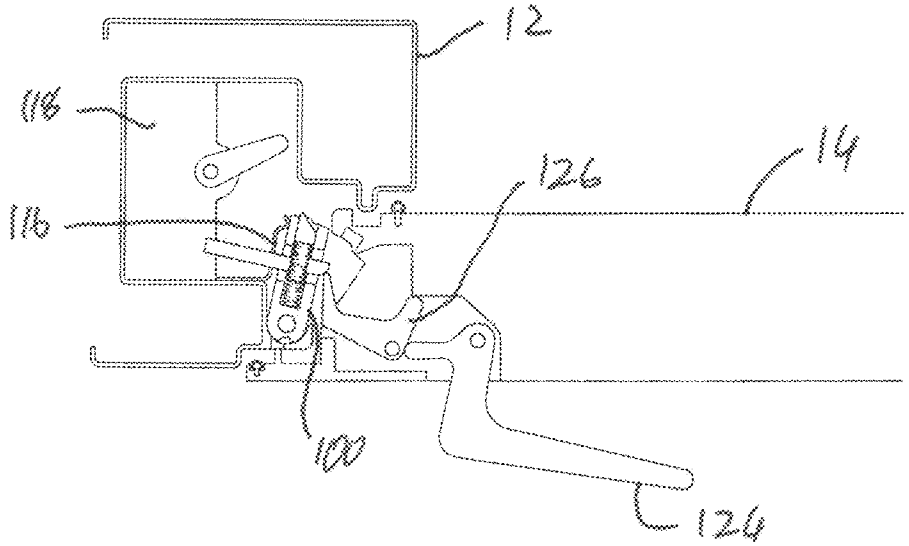
Figure 7E:
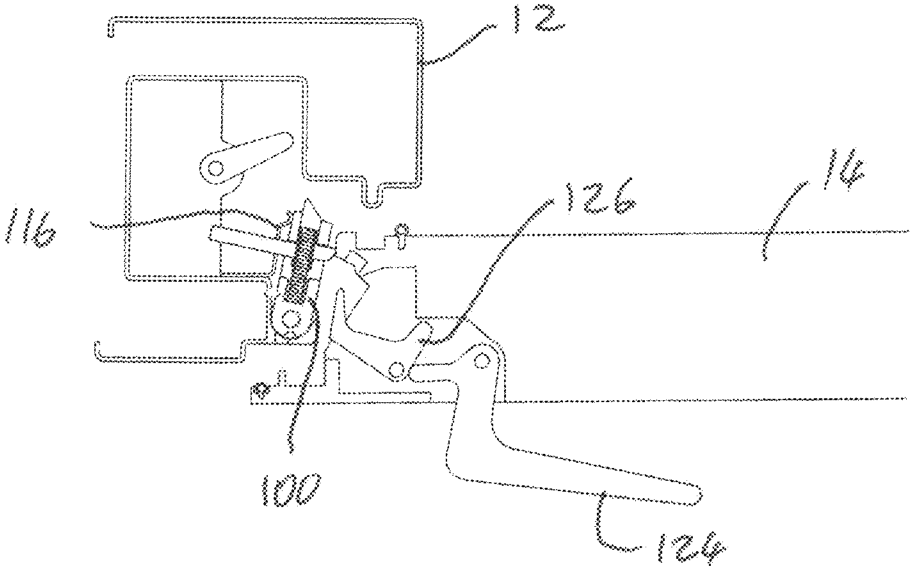
Figure 8:
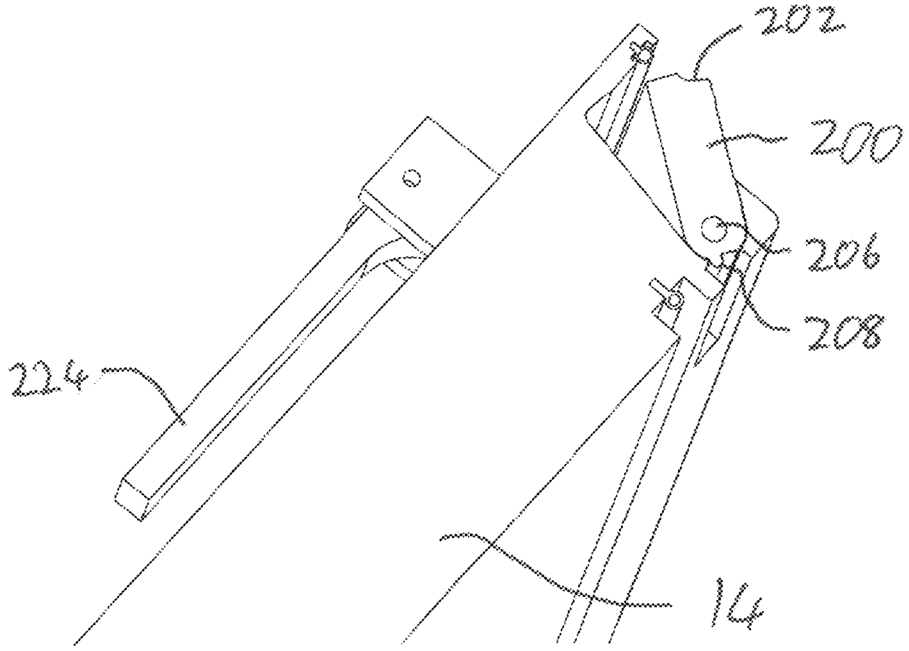
FIG. 8 is a partial, cut-away isometric view of an implementation of the panel lock apparatus of FIG. 1, omitting the strike jamb.

(As before, this motion is accompanied by an initial displacement of panel 14 away from its fully closed position, due to the interaction of actuating surface 110 and input surface 108. Panel 14 is then free for a further opening motion (FIGS. 7D and 7E). The edge surfaces of panel 14 are configured to allow continued opening of the panel after rocker element 126 clears locking element 100, typically by sliding contact of various features of the panel over the surface of the locking element (in a manner similar to the closing motion of FIGS. 5A-5C).

Turning now to FIGS. 8-12C, the present invention can also be implemented with a lock mechanism associated with the panel. This implementation is conceptually and structurally similar to the strike-jamb side implementation described thus far, and analogous features will be designated by similar reference numerals incremented by 100. In this case, the lock mechanism includes a locking element 200 which is displaceable relative to panel 14 along a path of motion from a released position (FIGS. 9A-9B) in which panel 14 can be separated from strike jamb 12 to a locked position (FIG. 9D) in which locking element 200 obstructs displacement of panel 14 away from strike jamb 12. Locking element 200 and strike jamb 12 have complementary contact surfaces, designated 202 and 204, respectively. Contact surfaces 202 and 204 are preferably configured, through their shape, angle and/or position relative to the path of motion, such that a force applied to panel 14 directed to open the panel does not generate a force acting to displace the locking element back along the path of motion. In other words, in the locked position of FIG. 9D, force applied to panel 14 to try to open the panel is effectively opposed by forces transferred via locking element 200 between the panel and the strike jamb, with geometrical and/or frictional locking occurring between the locking element and the complementary surfaces of the panel and the strike jamb. As a result, the locking is effective without requiring any additional mechanism to secure the locking element in place. (As before, additional locking may optionally be provided to generate a "deadlock" effect, preventing unintentional or unauthorized displacement of the locking element away from the locking position, analogous to the deadlock described above with reference to FIGS. 4A-7E. However, the locking element is effective to prevent opening of the panel even without such additional locking.)

The complementary surfaces of the panel 14 to which locking element 200 transfers forces may be provided by a structure which defines the aforementioned path of motion. In the non-limiting but preferred options illustrated here, the path of motion is a pivotal motion about an axis 206, which may be defined by an axle extending through the locking element or by pivotal connection of the locking element to supports (not shown) integrated with panel 14. Additionally, or alternatively, secondary support surfaces 207 may be positioned such that, in the case of a heavy load applied to the panel, locking element 200 comes into contact with the secondary support surfaces which provide supplementary support.

Figure 9A:
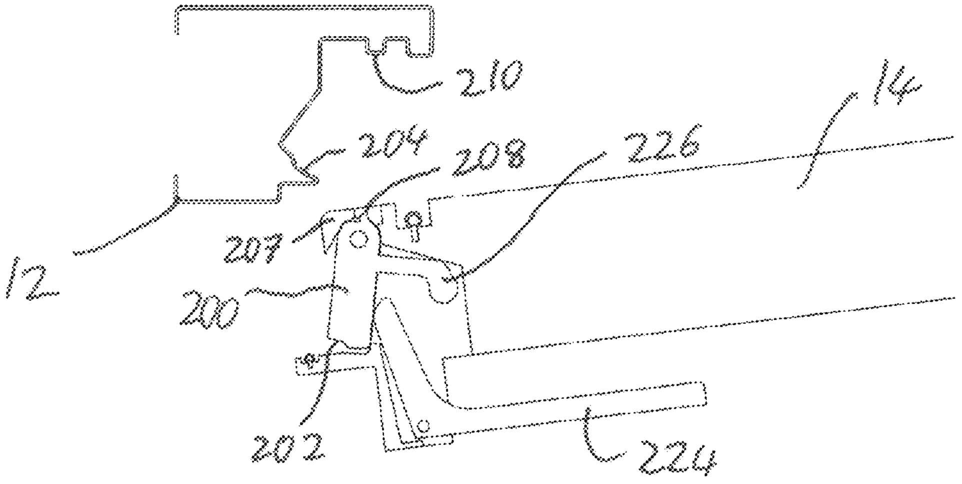
FIGS. 9A-9D are partial, horizontal cross-sectional views showing a sequence of positions during closing of the panel of FIG. 8.
Figure 9B:
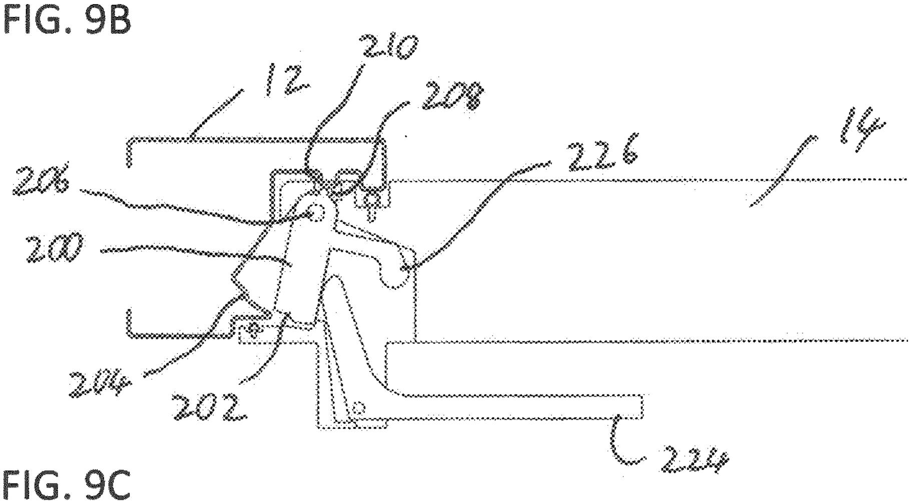
Figure 9C:
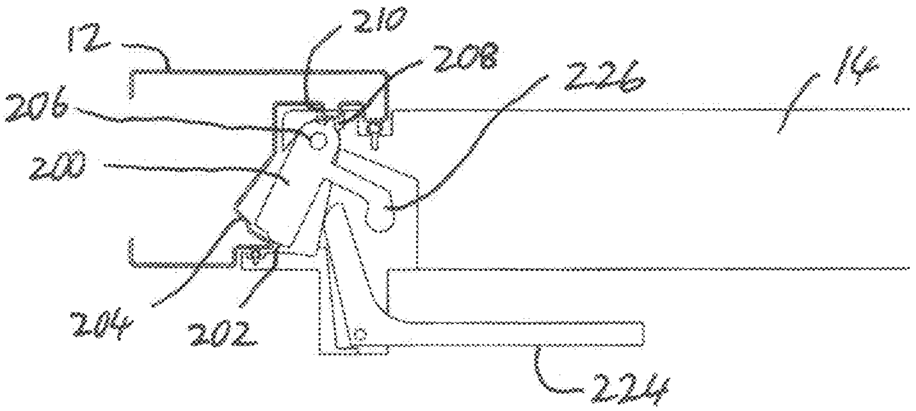
Figure 9D:
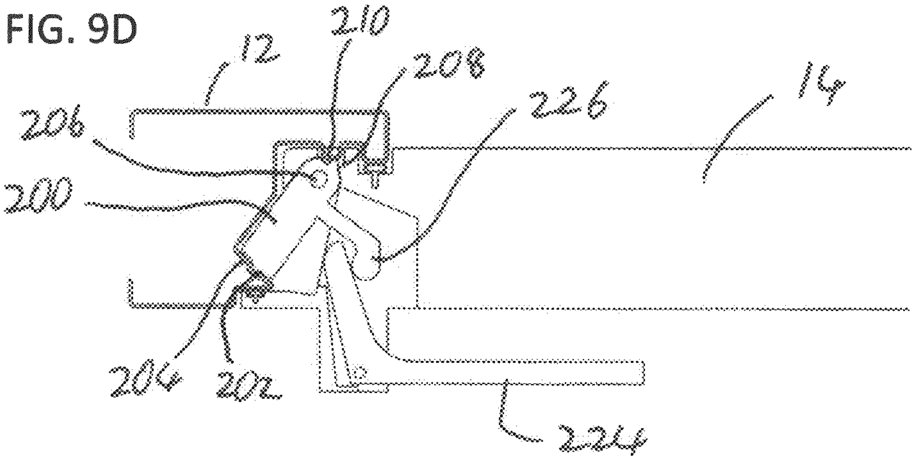
Figure 10A:
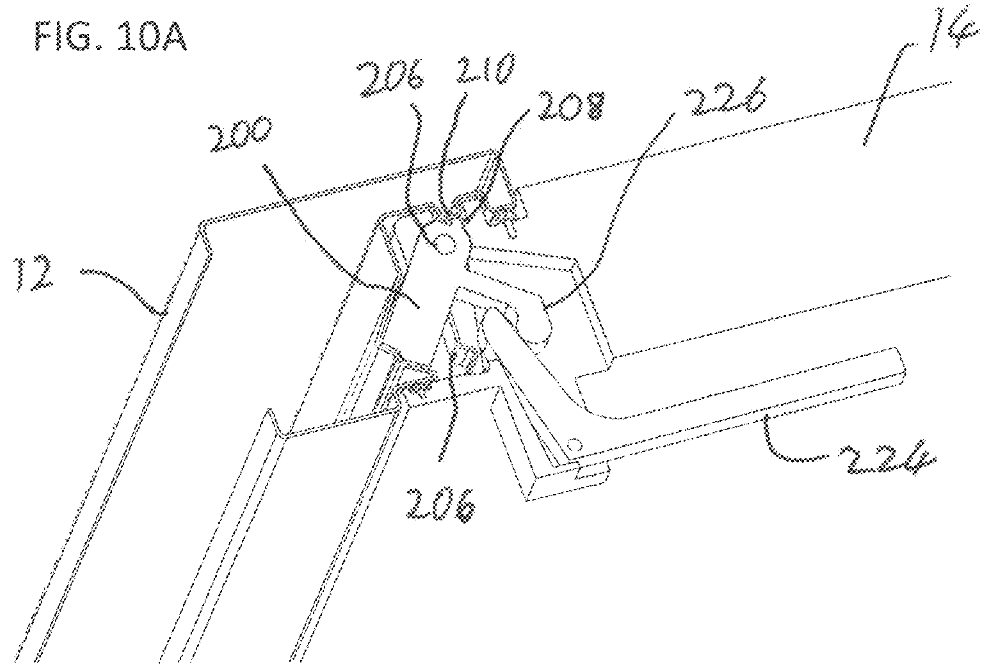
FIG. 10A is a partial, cut-away isometric view of a variant of the implementation of FIG. 8, cut away on a horizontal plane passing through a handle, shown with the panel closed against the strike jamb.
Figure 10B:
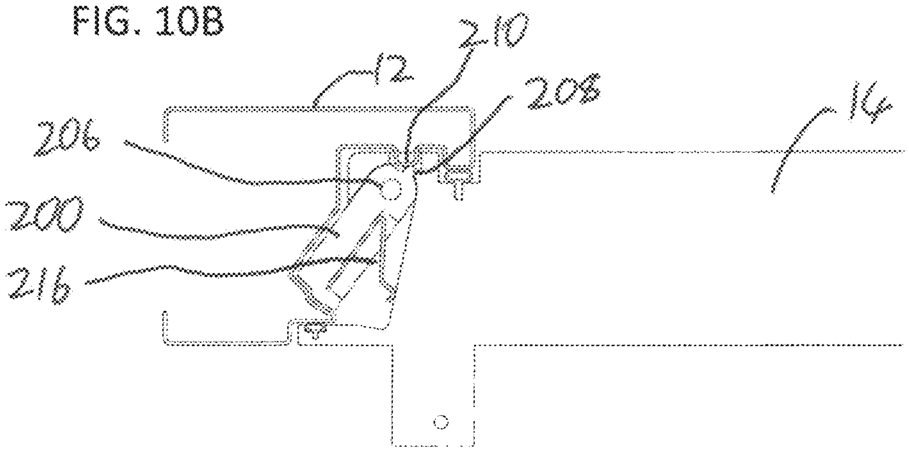
FIG. 10B is a view similar to FIG. 10A cut away on a horizontal plane below the handle, revealing a spring biasing a locking element to a locked position.

It is a particular feature of certain particularly preferred implementations of the present invention that locking element 200 provides an input surface 208 deployed so as to be displaced by an actuating surface 210 of strike jamb 12 during a closing motion of the panel from the open position to the closed position. This is illustrated by the series of positions shown in FIGS. 9A-9D. As panel 14 moves towards strike jamb 12 (shown in process in FIG. 9A), the panel reaches a point at which actuating surface 210 contacts input surface 208 (FIG. 9B). Further motion of the panel then applies force to input surface 208 so as to advance locking element 200 along its path of motion, in this case, rotation about axis 206, towards its locked position (sequence of FIGS. 9C-9D).

Input surface 208 here moves as a unit with locking element 200 so that displacement of the input surface by the closing motion of the panel displaces the locking element towards the locked position. The input surface may be integrally formed as part of locking element 200, or may be provided by a separate component which is attached to the locking element. In either case, at least during normal operation, the input surface is preferably rigidly associated with the locking element so that they move as a unit, undergoing the same solid body motion.

Both here and in the earlier implementations, the locking mechanism may be implemented so as to remain in an unlocked position while the panel 14 is open, as illustrated in FIGS. 8 and 9A-9D, in which case locking element may be free to move between its locked and unlocked positions, or a bistable spring mechanism (not shown) may be used to retain the locking element in its last state, either fully locked or fully unlocked. Alternatively, as illustrated in FIGS. 10A-12C, a spring element 216 (best seen in the cross-section of FIG. 10B) may be provided to bias locking element 200 towards its locked position.

Figure 11A:
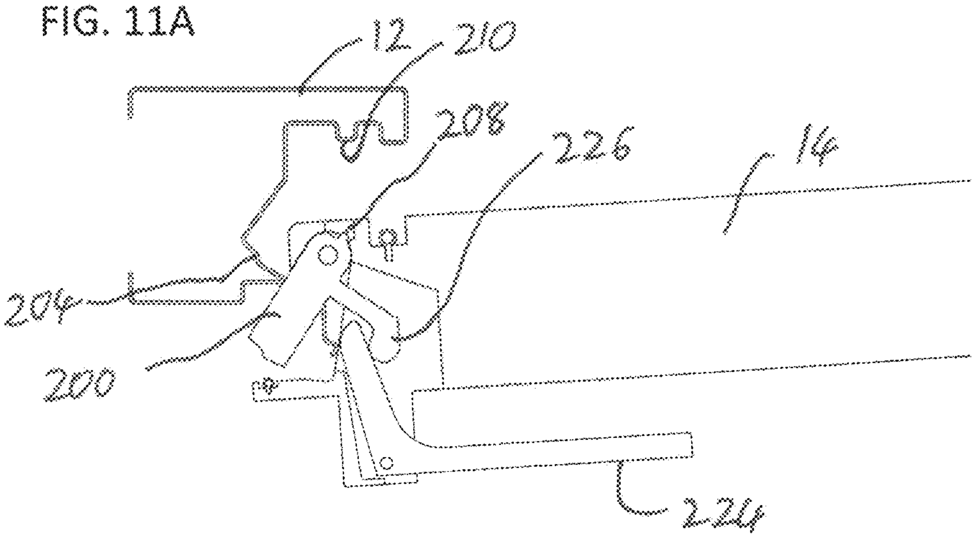
FIGS. 11A-11C are partial, horizontal cross-sectional views showing a sequence of positions during closing of the panel of FIG. 10A.
Figure 11B:
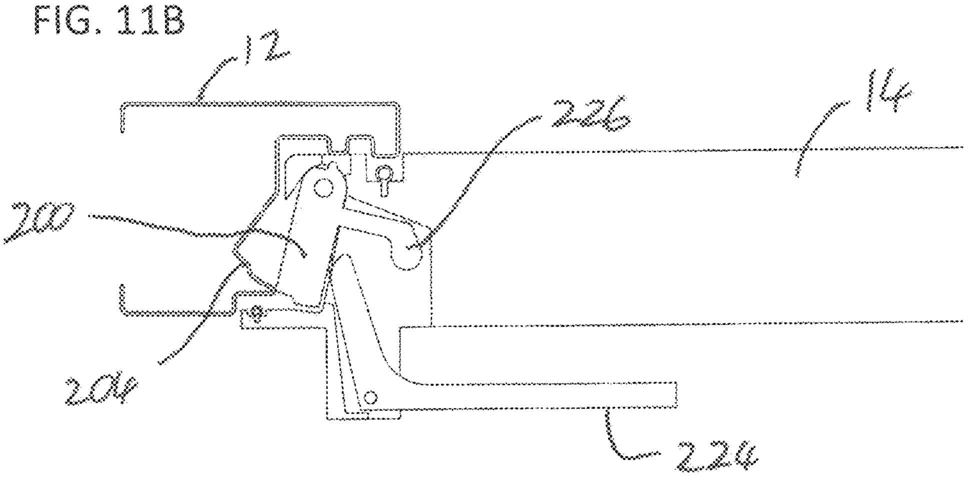
Figure 11C:
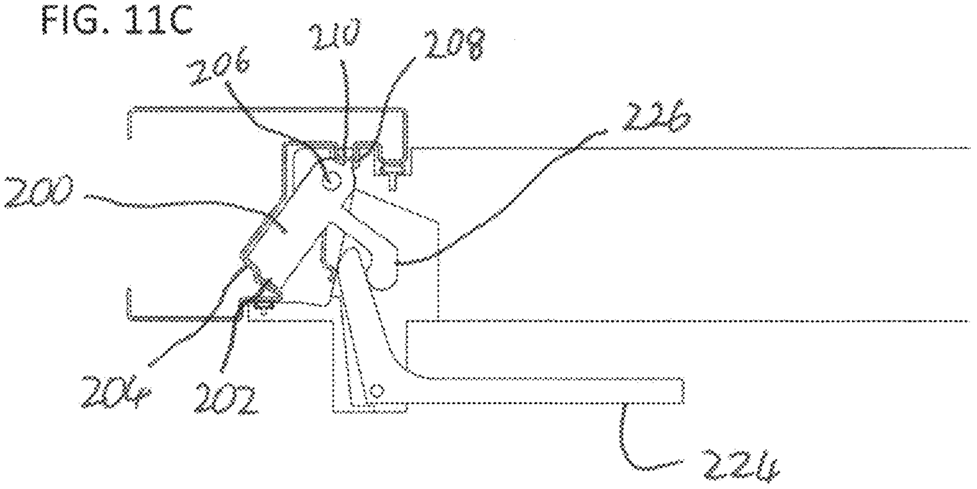
Figure 12A:
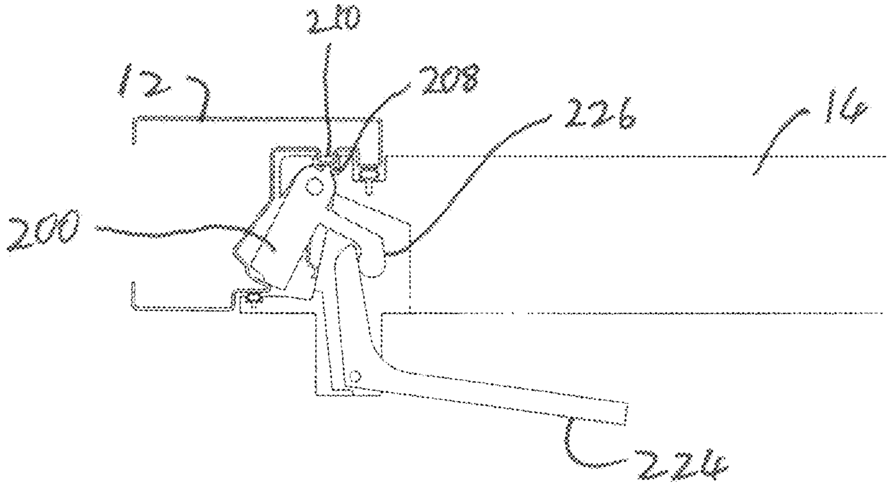
FIGS. 12A-12C are partial, horizontal cross-sectional views showing a sequence of positions during opening of the panel of FIG. 10A by operation of a handle on the panel.
Figure 12B:
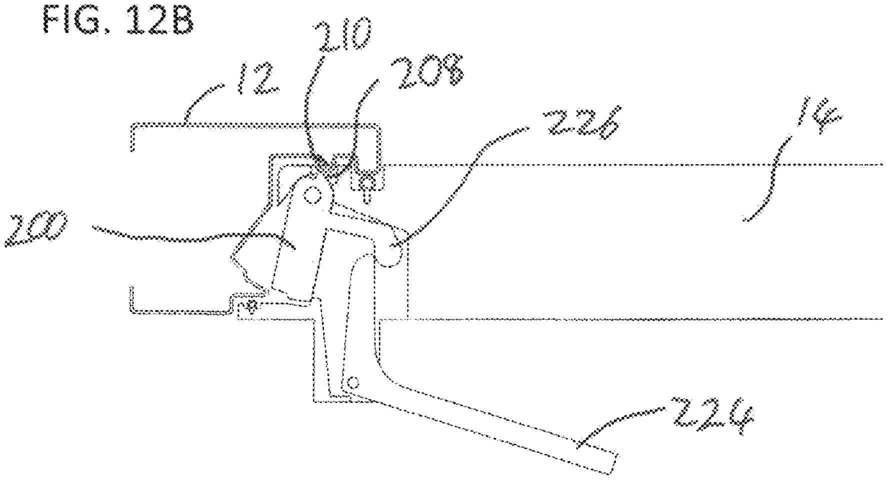
Figure 12C:
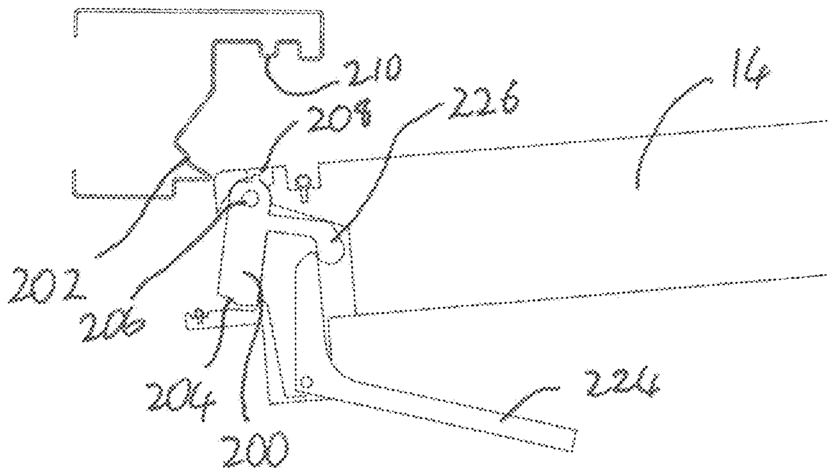
Figure 13A:
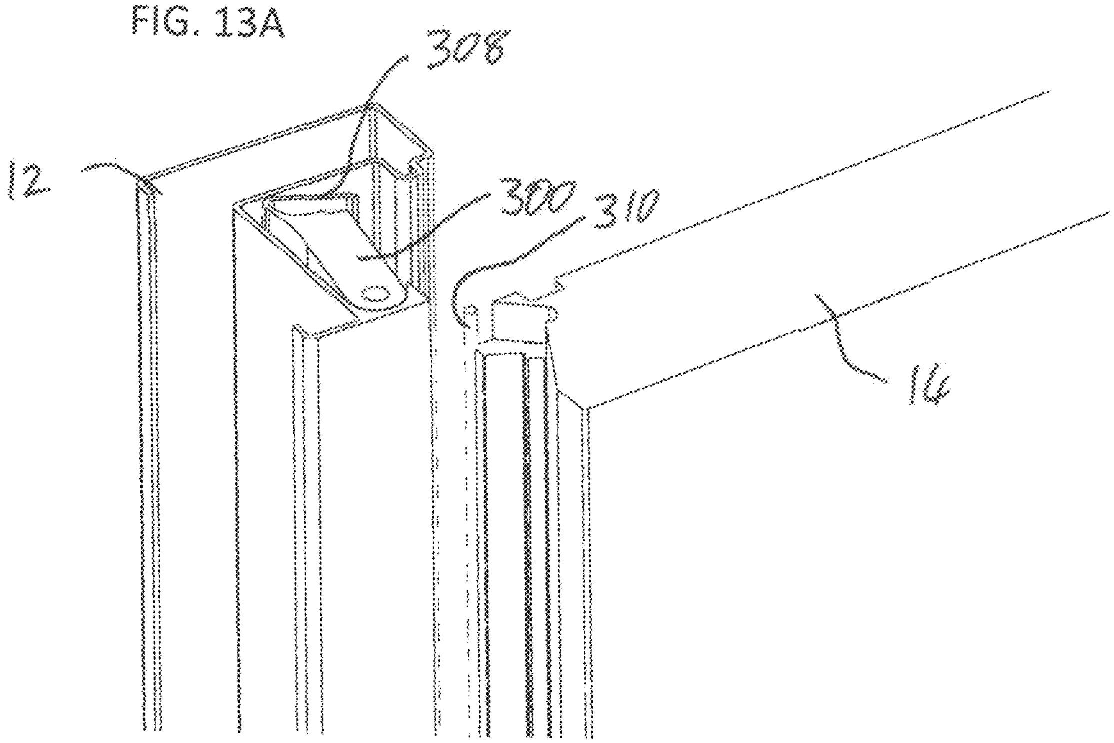
FIG. 13A is a partial, cut-away isometric view of an implementation of the panel lock apparatus of FIG. 1, shown with the panel open away from the strike jamb.
Figure 13B:
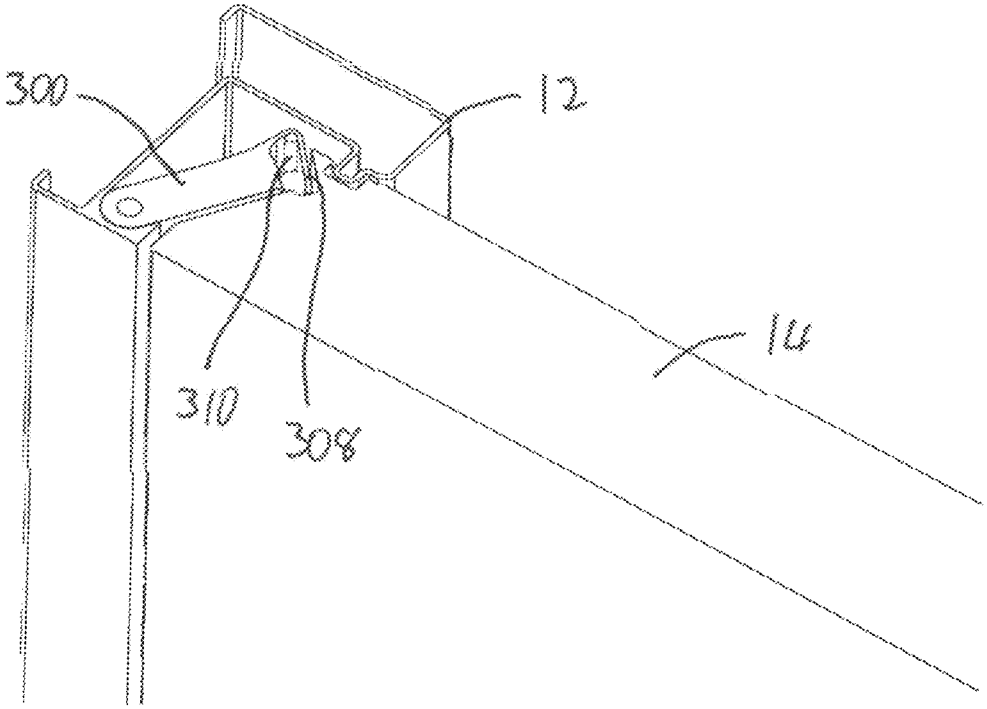
FIG. 13B is a partial, cut-away isometric view of the panel lock apparatus of FIG. 13A, shown with the panel closed against the strike jamb.

The sequence of closing panel 14 in the case of a spring-biased locking element 200 is illustrated in FIGS. 11A-11C, and is analogous to that described above with reference to FIGS. 5A-5E. (These illustrations do not show a catch to provide deadlock functionality, but this feature can readily be added in a manner analogous to that described above.) FIGS. 12A-12C illustrate displacement of locking element 200 to its unlocked position and opening of panel 14 by operation of a handle 224 implemented as a pivotal lever acting on a projecting arm 226 integrated with locking element 200.

In all other respects, the structure and operation of the panel-mounted locking mechanism will be fully understood by analogy to the strike jamb-mounted implementations described above.

Although the examples illustrated thus far have all employed locking elements which are displaced by contact with an input surface on the opposite side of a pivot axis from the locking contact surfaces, and in which locking occurs primarily through compression forces acting on the locking element, it should be noted that the principles of the present invention are not limited to this form of actuation, or to this form of locking element. Thus, for example, certain embodiments employ locking elements which retain the panel in a closed position by transferring forces via tension, torsion and/or bending moments between the panel and the strike jamb.

By way of one further non-limiting illustration, FIGS. 13A-14D illustrate a further panel locking apparatus according to a further implementation of the present invention. In this case, a locking element 300, pivotally mounted relative to strike jamb 12, has an input surface 308 implemented as a hook or rail projecting from the locking element. The rail is positioned to be engaged by a corresponding actuating surface 310, here implemented as a pin, mounted on panel 14. The position and angle of the rail is chosen such that the pin engages a first region of the rail as the panel approaches the frame, and by sliding engagement of the pin with the rail during the terminal part of the closing motion of the panel, locking element 300 is displaced to a locking position, engaged with the panel, so as to oppose opening of the panel. To further reduce friction, the pin may optionally be replaced by a roller bearing (which is still considered to be an abutment feature moving with the panel).

Figure 14A:
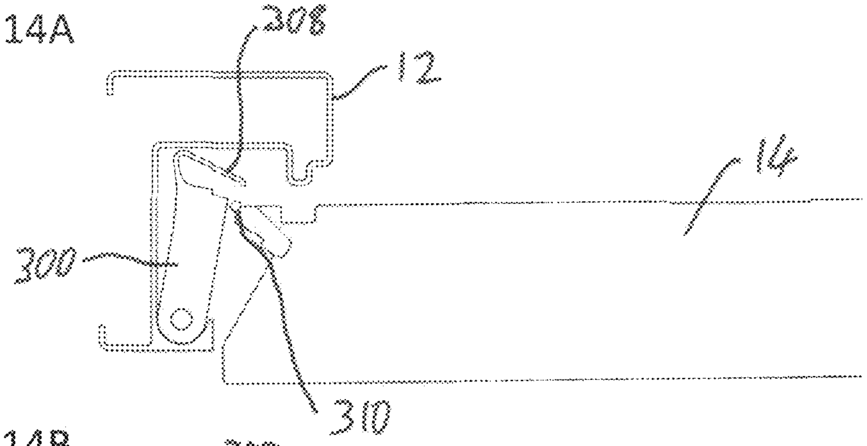
FIGS. 14A-14D are partial, horizontal cross-sectional views showing a sequence of positions during closing of the panel of FIG. 13A.
Figure 14B:
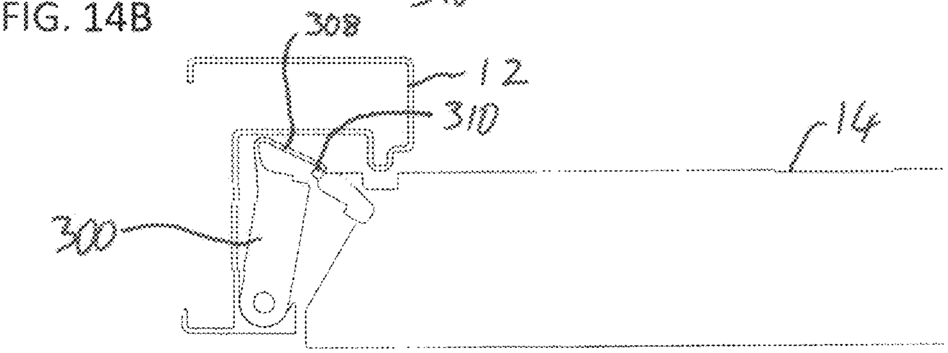
Figure 14C:
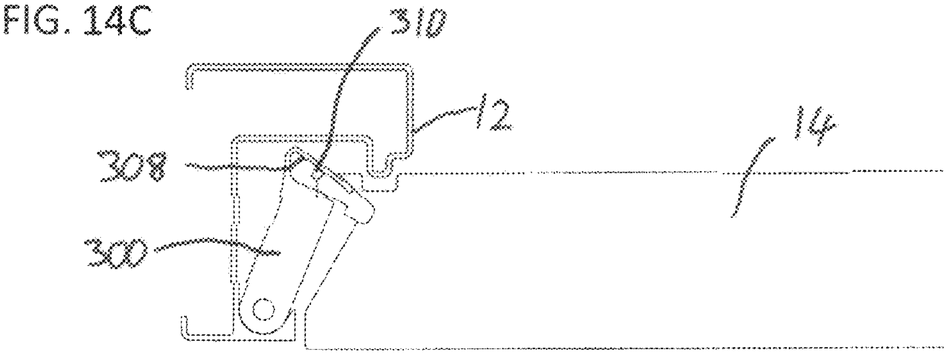
Figure 14D:
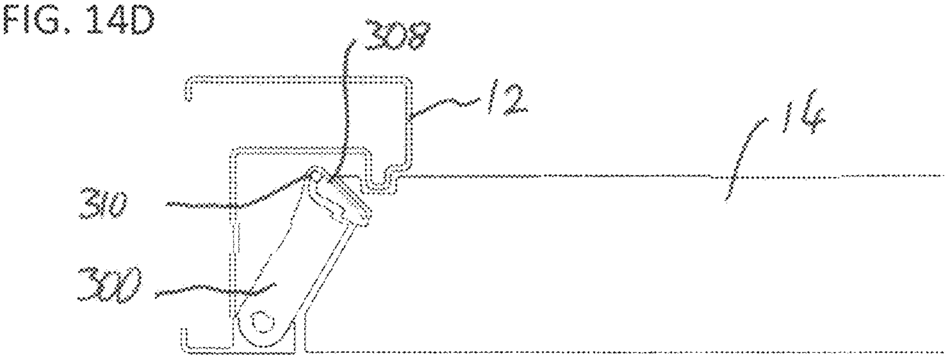

In the case illustrated here, the rail is located near a distal extremity of a pivotally mounted locking element, i.e., near the end furthest from the axis of rotation, and in this case, extends beyond the main locking abutment surface of the locking element. The rail may be straight as shown, or may define a curved contact path, depending on mechanical considerations of the design, as will be clear to a person having ordinary skill in the art. FIGS. 14A-14D illustrate the sequence of positions of the panel, and the corresponding displacement of the locking element, during a sequence of closing the panel. The extent of the motion of the locking element during the terminal part of the panel's closing motion should be sufficient to allow the complementary locking abutment surfaces of the panel to pass the locking element (FIG. 14B), and then to fully engage in the locked position of the locking element (FIG. 14D).

As a result of this structure, when an unlocking mechanism (not shown) is operated to retract the locking element from engagement with the panel, the reverse path of motion will be followed, slightly ejecting the panel from the frame.

It will be noted that the type of locking element illustrated here, and in certain other particularly preferred embodiments of the invention, is a pivotally displaceable locking element which pivots between an unlocked position and a locked position and which, in the locked position, is deployed in abutment with a corresponding abutment surface of the panel (typically either via the hinge or another support surface behind the hinge) so as to transfer forces between the panel and the frame when force is applied to open the panel. The "locked state" is preferably effective to oppose opening of the panel without requiring any supplementary retaining mechanism to complete the locking effect.

Here too, certain most preferred implementations may provide a supplementary retaining mechanism, or "deadlock", to oppose unintended or unauthorized displacement of the locking element from its locked state to its unlocked state. It should be noted however that, like in the previous examples, any supplementary retaining mechanism provides added protection against undesired unlocking of the lock, but does not bear a load (or at least not a significant load) in opposing opening of the panel in the locked state.

As noted earlier, the various input surfaces 108, 208 and 308 of the locking elements of the present invention each preferably move together with their respective locking elements, typically rigidly, and the corresponding actuating surfaces 110 and 310 move with panel 14 or, in the case of actuating surface 210, are fixed to strike jamb 12. Despite these generally rigid interrelations, it should be noted that either the input surface or the actuating surface of each embodiment may optionally be selectively redeployable in order to switch between different modes of functionality. Thus, for example, it may be possible to selectively deactivate the "positive-locking" function of the apparatus of the present invention, for example, by retracting actuating surface 110 or by moving it out of alignment with input surface 108.

It should be noted that the openings 10 and panels 14 of the present invention may be any sort of openings and panels, including doors, windows, safes and any and all other applications in which a panel is used to selectively close an opening.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

It will be appreciated that the above descriptions are intended only to serve as examples, and that many other embodiments are possible within the scope of the present invention as defined in the appended claims.

What is claimed is:

1. An apparatus comprising:

(a) an opening bounded in part by a strike jamb;

(b) a panel mounted relative to said opening so as to be displaceable between an open position in which said panel is separated from said strike jamb to leave at least part of said opening open and a closed position in which said panel closes against said strike jamb; and (c) a lock mechanism associated with said strike jamb, said lock mechanism comprising a locking element displaceable relative to said strike jamb along a path of motion from a released position in which said panel can be separated from said strike jamb to a locked position in which said locking element obstructs displacement of said panel from said strike jamb, contact surfaces of said locking element and said panel being such that a force applied to said panel directed to open said panel does not generate a force acting to displace said locking element back along said path of motion, wherein said locking element provides an input surface deployed so as to be displaced by an actuating surface of said panel during a closing motion of said panel from said open position to said closed position, said input surface moving as a unit with said locking element such that there is no relative motion between said input surface and said locking element, such that displacement of said input surface by the closing motion of said panel displaces said locking element towards said locked position.

2. The apparatus of claim 1, wherein said input surface and said actuating surface are deployed such that displacement of said locking element towards said locked position begins prior to said panel reaching said closed position.

3. The apparatus of claim 1, wherein, when displaced towards said locked position, said locking element passes a critical point such that an opening force applied to said panel results in geometrical or frictional locking of said locking element with said panel and said strike jamb sufficient to oppose displacement of said locking element towards said released position.

4. The apparatus of claim 1, wherein said lock mechanism is configured such that completion of said closing motion of said panel can only occur when said locking element assumes said locked position.

5. The apparatus of claim 1, wherein said locking element is pivotally mounted about an axis of rotation.

6. The apparatus of claim 5, wherein a distance from said axis of rotation to said contact surface of said locking element is greater than a distance from said axis of rotation to said input surface.

7. The apparatus of claim 5, wherein a part of said panel overlaps a part of said strike jamb in said closed position, and wherein said input surface is located in a region of said overlap.

8. The apparatus of claim 1, wherein said panel is hingedly mounted relative to said opening.

9. The apparatus of claim 1, wherein said panel is slidingly mounted relative to said opening.

10. An apparatus comprising:

(a) an opening bounded in part by a strike jamb;

(b) a panel mounted relative to said opening so as to be displaceable between an open position in which said panel is separated from said strike jamb to leave at least part of said opening open and a closed position in which said panel closes against said strike jamb; and (c) a lock mechanism associated with said panel, said lock mechanism comprising a locking element displaceable relative to said panel along a path of motion from a released position in which said panel can be separated from said strike jamb to a locked position in which said locking element obstructs displacement of said panel from said strike jamb, contact surfaces of said locking element and said strike jamb being such that a force applied to said panel directed to open said panel does not generate a force acting to displace said locking element back along said path of motion, wherein said locking element provides an input surface deployed so as to be displaced by an actuating surface of said strike jamb during a closing motion of said panel from said open position to said closed position, said input surface moving as a unit with said locking element such that there is no relative motion between said input surface and said locking element, such that displacement of said input surface by the closing motion of said panel displaces said locking element towards said locked position.

11. The apparatus of claim 10, wherein said input surface and said actuating surface are deployed such that displacement of said locking element towards said locked position begins prior to said panel reaching said closed position.

12. The apparatus of claim 10, wherein, when displaced towards said locked position, said locking element passes a critical point such that an opening force applied to said panel results in geometrical or frictional locking of said locking element with said panel and said strike jamb sufficient to oppose displacement of said locking element towards said released position.

13. The apparatus of claim 10, wherein said lock mechanism is configured such that completion of said closing motion of said panel can only occur when said locking element assumes said locked position.

14. The apparatus of claim 10, wherein said locking element is pivotally mounted about an axis of rotation.

15. The apparatus of claim 14, wherein a distance from said axis of rotation to said contact surface of said locking element is greater than a distance from said axis of rotation to said input surface.

16. The apparatus of claim 14, wherein a part of said panel overlaps a part of said strike jamb in said closed position, and wherein said input surface is located in a region of said overlap.

17. The apparatus of claim 10, wherein said panel is hingedly mounted relative to said opening.

18. The apparatus of claim 10, wherein said panel is slidingly mounted relative to said opening.

* * * * *